United States Patent Office 3,530,219
Patented Sept. 22, 1970

3,530,219
PHARMACEUTICAL COMPOSITION CONTAINING
6,11-DIAMINO MORPHANTHRIDINES
Gordon Northrop Walker, Morristown, N.J., assignor to
Ciba Corporation, Summit, N.J., a corporation of Delaware
No Drawing. Continuation-in-part of application Ser. No. 674,636, Oct. 11, 1967, now Patent No. 3,471,473, which is a continuation-in-part of application Ser. No. 622,477, Mar. 13, 1967, which in turn is a continuation-in-part of application Ser. No. 599,696, Dec. 7, 1966. This application Nov. 12, 1968, Ser. No. 775,115
Int. Cl. A61k 27/00
U.S. Cl. 424—244     1 Claim

ABSTRACT OF THE DISCLOSURE 6,11 - diamino - morphanthridines, e.g. those of the formula

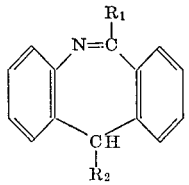

$R_{1,2}$=an amino group salts and quaternaries thereof, exhibit diuretic effects.

CROSS REFERENCES TO RELATED APPLICATIONS

This is a continuation-in-part of application Ser. No. 674,636, filed Oct. 11, 1967, and now U.S. Pat. No. 3,471,473, which in turn is a continuation-in-part of application Ser. No. 622,477, filed Mar. 13, 1967, and now abandoned, which in turn is a continuation-in-part of application Ser. No. 599,696, filed Dec. 7, 1966, and now abandoned.

SUMMARY OF THE INVENTION

The present invention concerns and has for its object the provision of new 6,11-diamino-morphanthridines, more particularly those of the Formula I

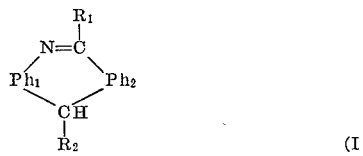

in which each of $Ph_1$ and $Ph_2$ stands for a 1,2-phenylene radical and each of $R_1$ and $R_2$ for an amino group, salts and quaternaries thereof, as well as of corresponding pharmaceutical compositions and methods for the preparation and application of these products. Said compositions are primarily useful as diuretic and triuretic agents in order to relieve excessive water and/or salt retention, for example, in connection with heart and kidney diseases, and in the adjunctive management of hypertension.

DESCRIPTION OF THE PREFERRED EMBODIMENTS

The 1,2-phenylene radicals $Ph_1$ and $Ph_2$ are unsubstituted or substituted by one or more than one of the same or of different substituents, for example, lower alkyl, such as methyl, ethyl, n- or i-propyl or -butyl, free or functionally converted hydroxy or mercapto groups, such as lower alkoxy or alkylmercapto, e.g. methoxy, ethoxy, n- or i-propoxy or -butoxy, methyl- or ethylmercapto, halogeno, e.g. fluoro, chloro or bromo, trifluoromethyl, nitro, amino, especially di-lower alkylamino, e.g. dimethylamino or diethylamino, or sulfamyl. Preferred substituted 1,2-phenylene radicals are (lower alkyl)-1,2-phenylene, (lower alkoxy)-1,2-phenylene, (lower alkylmercapto)-1,2-phenylene, (halogeno)-1,2-phenylene, (trifluoromethyl)-1,2-phenylene, (nitro)-1,2-phenylene, (di-lower alkylamino)-1,2-phenylene and (sulfamyl)-1,2-phenylene.

The amino groups $R_1$ and $R_2$ are preferably secondary, but especially tertiary amino groups, such as mono- or di-lower alkylamino, e.g. methylamino, ethylamino, n- or i-propylamino or -butylamino, dimethylamino, N-methyl-N-ethylamino, diethylamino, di-n-propylamino, di-isopropylamino, di-isobutylamino or di-n-butylamino, free etherified or esterified N-(hydroxy-lower alkyl)-N-lower alkylamino, mono- or di-(hydroxy-lower alkyl)-amino, e.g. N-(lower alkoxy-lower alkyl)-N-lower alkylamino, mono- or di-(lower alkoxy-lower alkyl)-amino in which the oxygen atom is separated from the amino nitrogen atom by at least two carbon atoms, e.g. N-(2-hydroxy- or 2-methoxyethyl)-N-methylamino, mono- or di-(2-hydroxy- or 2-methoxyethyl)-amino, monocyclic cycloalkylamino, N-cycloalkyl-N-lower alkylamino, cycloalkyl-lower alkylamino or N-cycloalkyl-lower alkyl-N-lower alkylamino in which cycloalkyl has preferably 3 to 7 ring-carbon atoms, e.g. cyclopropylamino, cyclopentylamino, N - cyclopentyl-N-methylamino, N-cyclohexyl-N-methylamino, N - cyclohexyl - N - ethylamino, cyclopropylmethylamino, 2 - cyclopentylethylamino, N - cyclopentylmethyl - N - ethylamino or N - (2 - cyclopentylethyl) - N - methylamino, aralkylamino or N - lower alkyl - N - aralkyl - amino, such as R - phenyl - lower alkylamino or N - lower alkyl - N - (R - phenyl)-lower alkylamino, R - phenylamino or N - lower alkyl - N - (R-phenyl)-amino, in which R stands for hydrogen, lower alkyl, lower alkoxy, lower alkylmercapto, halogeno, trifluoromethyl, nitro, di-lower alkylamino or sulfamyl, e.g. benzylamino, 1- or 2 - phenylethylamino, N - methyl-N - benzylamino, N - ethyl - N - benzylamino, N - ethyl-N-(1- or 2-phenylethyl)-amino, phenylamino or N-methyl-N-phenylamino, lower alkyleneimino or free, etherified or esterified hydroxy-alkyleneimino, e.g. ethyleneimino, pyrrolidino, 2-methyl-pyrrolidino, piperidino, 2- or 4-methyl-piperidino, 3- or 4-hydroxy-piperidino, 3-hydroxylmethyl-piperidino, 1,6- or 2,5-hexamethyleneimino, 1,7- or 2,6-heptamethyleneimino, lower monoaza-, -oxa- or -thia-alkyleneimino, e.g. piperazino, morpholino, 3-methyl-morpholino or thia-morpholino, N-lower alkyl-, N-(R-phenyl)-or free, etherified or esterified N-(hydroxy-lower alkyl)-monoaza-lower alkyleneimino, e.g. 4-methyl-, 4-ethyl-, 4-n-propyl, 4-i-propyl, 4-phenyl, 4-(2-hydroxyethyl)-, 4-(2-methoxyethyl), 4-(3-hydroxypropyl)- or 4-(3-ethoxypropyl)-piperazino, 3-methyl-, 3-ethyl- or 3-n-propyl-3-aza-1,5- or -1,6-hexyleneimino or 4-methyl-4-aza-1,7- or -2,6-heptyleneimino. In the above radicals two heteroatoms are separated by at least 2 carbon atoms and in the esters the acyl group present stands preferably for lower alkanoyl, such as acetyl, propionyl, butyryl or pivalyl, but also for lower alkenoyl, such as acryloyl or methacryloyl, monocyclic carbocyclic aroyl or aryl-lower alkanoyl or -alkenoyl, such as R-phenyl-lower alkanoyl or -alkenoyl, e.g. R-benzoyl, phenylacetyl or cinnamoyl.

The quaternaries of the present invention are, for example, those containing at least one additional N-lower alkyl or N-aralkyl group, e.g. one of those mentioned above.

The compounds of the invention exhibit valuable pharmacological properties. Apart from central nervous system depressing and antiinflammatory effects, they primarily show diuretic, natri- and chloriuretic activity, with only a slight effect on potassium excretion. This can be demonstrated in animal tests using, for example mammals, e.g. mice, rats or dogs, as test objects. Such tests can be performed, for example, by administering the compounds of the invention within a gelatin capsule to dogs, or in the form of aqueous solutions or suspensions by stomach tube to rats, or subcutaneously to mice, in an oral dosage range between about 0.75 to 100 mg./kg./day, preferably between about 1 to 50 mg./kg./day, advantageously between about 1 to 10 mg./kg./day. Simultaneously the test animals may receive various salt loads enterally or parenterally, for example, various amounts of subcutaneously applied 0.9% saline, e.g. 100 ml. thereof per medium-sized dog (beagle). Urine is then collected, e.g. at 2 hour intervals, with or without catheterization, and its volume, sodium, potassium and chloride content estimated and compared with that of the same untreated or saline-treated animals. The central nervous system depressing activity may be demonstrated in the classical mice jiggle cage test system and the antiinflammatory effects in the carrageenin rat paw edema test system, e.g. according to Winter et al., Proc. Soc. Exp. Biol & Med. 111, 544 (1962). Besides the above-mentioned utility, the compounds of this invention are also useful as intermediates in the manufacture of other valuable, especially pharmacologically active, compounds.

Particularly useful are compounds of Formula I, in which each of $Ph_1$ and $Ph_2$ is 1,2-phenylene, (lower alkyl)-1,2-phenylene, (lower alkoxy)-1,2-phenylene or (halogeno)-1,2-phenylene and each of $R_1$ and $R_2$ is di-lower alkylamino, lower alkyleneimino, monooxa- or -thia-lower alkyleneimino or N-lower alkyl- or N-(hydroxy- or lower alkanoyloxy-lower alkyl)-monoaza-lower alkyleneimino, as well as those in which each of $R_1$ and $R_2$ also is monoaza-lower alkyleneimino or N-(lower alkoxy-lower alkyl)-monoaza-lower alkyleneimino, in which radicals the heteroatoms are separated by at least 2 carbon atoms, as well as those compounds in which each of $R_1$ and $R_2$ also is $R_0$-phenyl-lower alkylamino or N-lower alkyl-N-($R_0$-phenyl)-lower alkylamino, in which $R_0$ stands for hydrogen, lower alkyl, lower alkoxy or halogeno, acid addition salts and lower alkyl quaternaries thereof.

Especially valuable are the compounds of Formula II

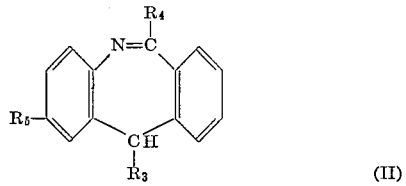

(II)

in which both $R_3$ and $R_4$ are identical and represented by dimethylamino, diethylamino, pyrrolidino, piperidino,- morpholino or 4-methyl-, 4-ethyl- or 4-(2-hydroxy-ethyl)-piperazino and $R_5$ is hydrogen or chloro, as well as those in which $R_3$ and $R_4$ have the same meaning but being different and also represent amino, benzylamino, N-methyl-N-benzylamino or hexamethyleneimino and therapeutically acceptable acid addition salts thereof.

Of the compounds of Formula II those are preferred, in which $R_3$ is dimethylamino or diethylamino, $R_4$ is pyrrolidino, piperidino, hexamethyleneimino or morpholino and $R_5$ is hydrogen, especially the 6-morpholino- or -hexamethyleneimino-11-dimethylamino or -diethylamino-morphanthridine and therapeutically acceptable acid addition salts of all these compounds which, when applied to rats at oral doses between about 0.75 and 50 mg./kg./day, or to dogs at oral doses between about 1 and 10 mg./kg./day, show outstanding diuretic effects or, when applied to rats at oral doses between about 10 and 50 mg./kg./day show also good antiinflammatory effects or, when applied to mice at subcutaneous doses between about 1 and 100 mg./kg./day show some quieting effects.

The compounds of the invention are prepared according to methods in themselves known. Advantageously they are obtained by reacting a reactive ester or ether of a 6-X-11-Y-morphanthridine, in which both of X and Y stand for hydroxy or one thereof stands for hydroxy and the other for an amino group, more particularly a compound of Formula III

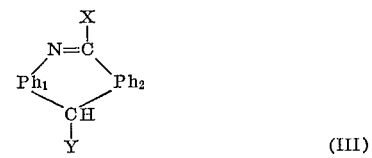

(III)

in which one of X and Y stands for halogeno, aliphatic or aromatic sulfonyloxy, lower alkoxy or azido, and the other for $R_1$, with ammonia or an amine, more particularly such of the formula $R_2$—H and, if desired, converting any resulting compound into another disclosed compound.

In the starting material of Formula III, one or both of X and Y preferably represents halogeno, e.g. chloro, bromo or iodo, but may also stand for a sulfonyloxy group, e.g. methane-, ethane- or benzene-sulfonyloxy, tosyloxy or brosyloxy.

The above process is carried out according to standard methods, in the presence or absence of diluents, preferably such as are inert to the reagents and are solvents thereof, or catalysts, condensing agents and/or inert atmospheres, at low temperatures, room temperature or advantageously elevated temperatures, at atmospheric or superatmospheric pressure.

In the above process the amine reagent is advantageously used in excess, in order to neutralize the generated acid. It may, however, also be used to equivalent amounts and in the presence of other condensing agents, such as inorganic or organic bases, e.g. alkali metal carbonates or bicarbonates or tertiary nitrogen bases, for example tri-lower alkylamines, N,N-dimethylaniline or pyridine.

The compounds of the invention so-obtained may be converted into each other according to known methods. For example, resulting compounds of Formula I, in which one or both of $R_1$ and $R_2$ are primary or secondary amino, for example, lower alkylamino, free, etherified or esterified hydroxy-lower alkylamino, cycloalkylamino, cycloalkyl-lower alkylamino, phenyl-lower alkylamino, phenylamino, lower alkylamino-lower alkylamino or free, etherified or esterified-hydroxy-lower alkylamino-lower alkylamino, may be reacted with a reactive ester of a corresponding alcohol or glycol, in order to obtain the corresponding compounds in which $R_1$ and/or $R_2$ is sec. or tert. amino. In the reaction with glycol esters and amino-lower alkylamino compounds, the monoaza-lower alkyleneimino moiety is formed. Resulting esters may be hydrolyzed or transesterified, resulting alcohols esterified and/or resulting tertiary amines quaternized in the usual manner.

The compounds of the invention are obtained in the free form or in the form of their salts, depending on the conditions under which the process is carried out; the salts are also included in the present invention. Salts that are obtained can be converted into the free bases in known manner, for example with alkalis or can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, benzenesulfonic, toluenesulfonic, naphthalenesulfonic and sulfanilic acid; methionine, tryptophane, lysine and arginine.

These or other salts for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines or alcohols mentioned above may be used in the form of their alkali metal, e.g. sodium or potassium salts. Mainly, those starting materials should be used in the process of the invention that lead to the formation of those compounds indicated above as being specially valuable.

The starting material used is known or, if new, may be prepared according to known methods, for example, by reducing a corresponding 5,6-dihydro-morphanthridine-6,11-dione with sodium borohydride and esterifying the resulting 11-hydroxy compound under mild conditions, e.g. with the use of thionyl or sulfonyl halides. Resulting 11-halo-5,6-dihydro-6-morphanthridones may then be reacted with sodium azide, ammonia or amines in order to yield the relatively stable 11-azides or 11-amines respectively. Under more drastic conditions the 11-hydroxy- or 11-amino-5,6-dihydro-6-morphanthridones are esterified in 6- or 6- and 11-position, for example, with the use of phosphorus pentahalides or oxyhalides and/or sulfonyl halides. Resulting esters of 11-amino-6-hydroxy- or 6,11-dihydroxy-morphanthridines may then be reacted with corresponding amines, the former also with alkali metal alkoxides, whereby the more reactive esterified 6-hydroxy group reacts first and is converted into the desired 6-amino or 6-alkoxy group, for example, with one mol epuivalent each of the 6,11-diester and the amine, the 6-amino-11-esters are obtained under mild conditions.

The compounds of the invention can be used, for example, for the manufacture of pharmaceutical compositions containing them in conjunction or admixture with inorganic or organic, solid or liquid pharmaceutical excipients, suitable preferably for enteral, but also parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, and all parts wherever given are parts by weight.

EXAMPLE 1

To 5.8 g. crude 6,11-dichloro-morphanthridine, 150 ml. 25% aqueous dimethylamine are added while cooling in an ice bath and the mixture is stirred for 1 hour at room temperature. It is heated for 5 minutes on the steam cone and filtered. The residue is taken up in diethyl ether, the solution shaken with diluted hydrochloric acid, the aqueous layer made basic with aqueous sodium hydroxide and extracted with diethyl ether. The extract is washed with water, dried, filtered and evaporated. The residue is recrystallized from diethyl ether to yield the 6,11-bis-dimethylamino-morphanthridine of the formula

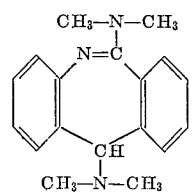

melting at 157–160°.

The starting material is prepared as follows: The mixture of 5.0 g. 11-hydroxy-5,6-dihydro-6-morphanthridone, 50 ml. phosphorus oxychloride and 5 drops of pyridine is refluxed for 2 hours. It is then evaporated in vacuo to yield the 6,11-dichloro-morphanthridine, which advantageously is used without further purification; after recrystallization from diethyl ether it melts at 166–169°.

EXAMPLE 2

The mixture of 5.8 g. crude 6,11-dichloro-morphanthridine and 50 ml. pyrrolidine is allowed to stand 1 hour at room temperature. It is then refluxed for 3 hours and evaporated at the steam cone. The residue is triturated with 200 ml. water, filtered off and dried. It is recrystallized from diethyl ether to yield the 6,11-bis-pyrrolidino-morphanthridine of the formula

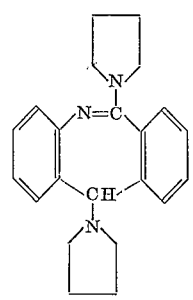

melting at 125–127°.

EXAMPLE 3

The mixture of 5.8 g. 6,11-dichloro-morphanthridine and 50 ml. piperidine is heated at the steam cone for ¾ of an hour. It is then evaporated in vacuo, the residue triturated with water, the mixture extracted with diethyl ether, the extract washed with water and shaken with diluted hydrochloric acid. The acidic solution is washed with diethyl ether, made basic with aqueous sodium hydroxide and extracted with diethyl ether. The extract is washed with water, dried, filtered and evaporated. The residue is recrystallized from diethyl ether to yield the 6,11-bis-piperidino-morphanthridine of the formula

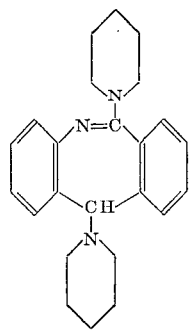

melting at 128–131°.

EXAMPLE 4

The mixture of 5.8 g. crude 6,11-dichloro-morphanthridine and 40 ml. morpholine is heated on the steam cone for 2 hours. It is cooled, poured into water and the precipitate formed filtered off. It is washed with water, dried and recrystallized from ethanol to yield the 6,11-bis-morpholino-morphanthridine of the formula

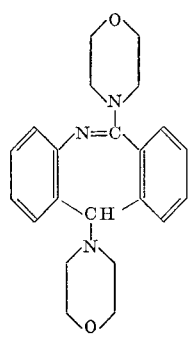

melting at 182–184°.

EXAMPLE 5

The mixture of 5.8 g. crude 6,11-dichloro-morphanthridine and 40 ml. 1-methyl-piperazine is heated on the steam cone for 3 hours and allowed to stand overnight at room temperature. It is evaporated at the steam cone, the residue triturated with 200 ml. water, the mixture extracted wih diethyl ether, the extract washed with water and shaken with diluted hydrochloric acid. The acidic aqueous layer is washed with diethyl ether, made basic with aqueous sodium hydroxide and extracted with diethyl ether. The extract is washed with water, dried, evaporated and the residue recrystallized from diethyl ether to yield the 6,11-bis-(4-methyl-piperazino)-morphanthridine of the formula

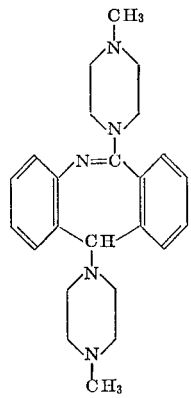

melting after drying in vacuo at 95–99°.

EXAMPLE 6

To 2.3 g. crude 2,6,11-trichloro-morphanthridine 30 ml. anhydrous dimethylamine are added at 0° and the mixture kept at this temperature for 2 hours, during which time predominantly the 2,11-dichloro - 6 - dimethylamino-morphanthridine is formed. Hereupon 50 ml. 25% aqueous dimethylamine are added and the mixture heated and stirred for ½ hour on the steam cone. It is diluted with water, extracted with diethyl ether and the extract shaken with diluted hydrochloric acid. The aqueous layer is made basic with aqueous sodium hydroxide, extracted with diethyl ether, the extract dried, evaporated and the residue recrystallized from diethyl ether to yield the 2-chloro-6,11-bis-dimethylamino-morphanthridine of the formula

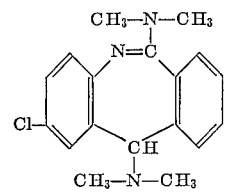

melting at 182–184°.

The starting material is prepared as follows: The mixture of 67.0 g. 5,6-dihydro-morphanthridin-6,11-dione, 45.0 g. N-chloro-succinimide and 1.2 liter glacial acetic acid is refluxed for 5 hours. Upon cooling, crystals separate which are filtered off, washed with diethyl ether and recrystallized from dimethylformamide to yield the 2-chloro-5,6-dihydro-morphanthridin-6,11-dione melting at 310°.

20.0 g. thereof are dissolved in 800 ml. methanol and 10.0 g. sodium borohydride are added in portions during about 10 minutes. The mixture is concentrated at the steam cone to about 100 ml. and then cooled. The precipitate formed is filtered off, washed with water, dried and recrystallized from methanol to yield the 2-chloro-11-hydroxy-5,6-dihydro-6-morphanthridone melting at 273–274°.

The mixture of 8.0 g. thereof, 70 ml. phosphorus oxychloride and 5 drops pyridine is refluxed for 1¼ hours. It is evaporated in vacuo to yield the 2,6,11-trichloro-morphanthridine, which advantageously is used without further purification. It is taken up in diethyl ether, the solution washed with diluted hydrochloric acid, dried, evaporated and the residue recrystallized from diethyl ether to yield the pure compound melting at 164–166°.

EXAMPLE 7

The mixture of 4.6 g. crude 2,6,11-trichloro-morphanthridine and 50 ml. morpholine is heated on the steam cone for 2 hours. It is cooled, triturated with ice water, the precipitate formed filtered off, washed with cold water and recrystallized from ethanol to yield the 2-chloro-6,11-bis-morpholino-morphanthridine of the formula

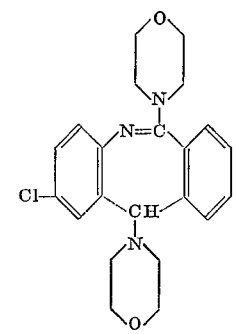

melting at 213–217°.

EXAMPLE 8

To 5.0 g. 2,6,11-trichloro-morphanthridine 15 ml. pyrrolidine are added portionwise and the mixture is heated at the steam cone for 5 minutes. The solution formed is allowed to stand at room temperature overnight and is finally heated at the steam cone for 2 hours. It is poured into cold water, the precipitate formed filtered off, washed with water, dried and recrystallized from methanol to yield the 2-chloro-6,11-bis-pyrrolidino morphanthridine of the formula

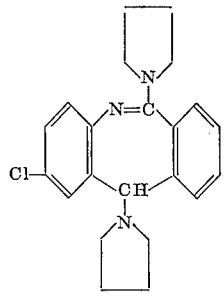

melting at 113–116°.

EXAMPLE 9

To 1.5 g. 2,6-dichloro-11-pyrrolidino-morphanthridine 15 ml. anhydrous dimethylamine are added portionwise while stirring and the mixture is kept for one hour in the freezer box. Hereupon the excess dimethylamine is evaporated and the residue triturated with water. It is filtered off, washed with water, taken up in diethyl ether, the solution dried, filtered and evaporated. The residue is recrystallized from methanol to yield the 2-chloro-6-dimethylamino-11-pyrrolidino-morphanthridine of the formula

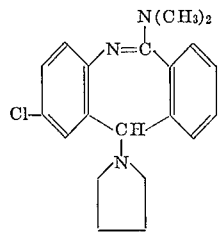

melting at 126–128°.

The starting material is prepared as follows: The mixture of 2,0 g. 2-chloro-11-pyrrolidino-5,6-dihydro-6-morphanthridone, 25 ml. phosphorus oxychloride and 3 drops pyridine is refluxed for 10 minutes and the solution obtained is allowed to stand at room temperature overnight. It is again refluxed for 15 minutes and evaporated, to yield the 2,6-dichloro-11-pyrrolidino-morphanthridine, which is used without further purification.

EXAMPLE 10

To 11 g. 2,6-dichloro-11-(4-methyl-piperazino)-morphanthridine, 120 g. anhydrous dimethylamine are added portionwise and the mixture is allowed to stand for 3 hours at room temperature. After evaporation of the excess dimethylamine, the mixture is poured into cold water, the residue formed filtered off, washed with water and dissolved in diethyl ether. The solution is dried, filtered, evaporated and the residue recrystallized from methanol to yield the 2-chloro-6-dimethylamino-11-(4-methyl-piperazino)-morphanthridine hemimethanolate of the formula

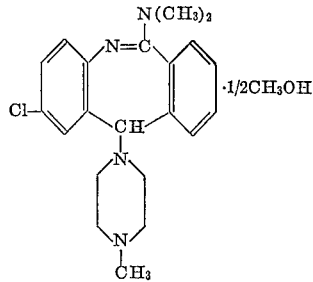

melting at 125–126°.

The starting material is prepared as follows: The mixture of 2 g. 2-chloro-11-(4-methyl-piperazino)-5,6-dihydro-6-morphanthridone and 50 ml. phosphorus oxychloride is refluxed for one hour and then evaporated, to yield the 2,6 - dichloro-11-(4-methyl-piperazino)-morphanthridine of 2.0 g. 2-chloro-11-pyrrolidino-5,6-dihydro-6-dine which is used without further purification. In the analogous manner the 6-dimethylamino-11-(4-methyl-piperazino)-morphanthridine is obtained, M.P. 154–156°.

EXAMPLE 11

To 3.5 g. 6-chloro-11-pyrrolidino-morphanthridine, 65 ml. anhydrous dimethylamine are added portionwise during ¾ of an hour while stirring. Hereupon ice water is added, the precipitate formed filtered off, washed with water and dissolved in diethyl ether. The solution is dried, filtered, evaporated and the residue recrystallized from methanol to yield the 6-dimethylamino-11-pyrrolidino-morphanthridine of the formula

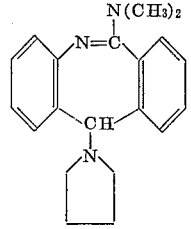

melting at 124–125°.

EXAMPLE 12

To 8.5 g. 2,6-dichloro-11-morpholino-morphanthridine, 100 g. anhydrous dimethylamine are added portionwise during one hour while stirring. The homogeneous mixture obtained is allowed to stand at room temperature overnight. Then 200 ml. water are added, the precipitate formed is filtered off, washed with water until neutral, and recrystallized from methanol to yield the 2-chloro-6-dimethylamino - 11 - morpholino-morphanthridine of the formula

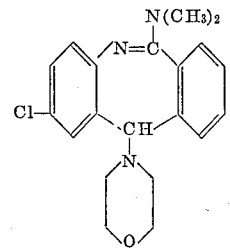

melting at 148–149°.

In the analogous manner the 6-dimethylamino-11-morpholino-morphanthridine is prepared, M.P. 182–184°.

EXAMPLE 13

To 5.5 g. 6-chloro-11-dimethylamino-morphanthridine 20 ml. morpholine are added portionwise while stirring and the mixture is heated at the steam cone for 30 minutes. After cooling 150 ml. water are added and the mixture is stirred for 1 hour. It is filtered, the residue taken up in diethyl ether, the solution dried, filtered and evaporated. The residue is recrystallized from aqueous methanol to yield the 6-morpholino-11-dimethylamino-morphanthridine of the formula

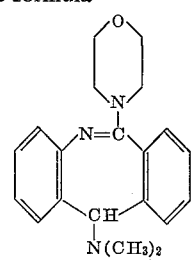

melting at 154–156°.

The starting material is prepared as follows: The mixture of 5 g. 11-dimethylamino-5,6-dihydro-6-morphanthridone and 75 ml. phosphorus oxychloride is refluxed for ½ hour and then evaporated to yield the 6-chloro-11-dimethylamino-morphanthridine, which is used without further purification.

EXAMPLE 16

In the analogous manner described in the previous examples, the final products listed below are prepared from corresponding amounts of the respective starting materials:

| Starting material | | Final product |
|---|---|---|
| 2-methoxy-6,11-dichloromorphanthridine | N-(2-hydroxyethyl)-N-methylamine | 2-methoxy-6,11-bis-[N-(2-hydroxy-ethyl)-N-methyl-amino]-morphanthridine. |
| 4-methylmercapto-6,11-dichloro-morphanthridine | N-cyclopentyl-N-ethylamine | 4-methylmercapto-6,11-(bis-(N-cyclopentyl-N-ethyl-amino)-morphanthridine. |
| 9-trifluoromethyl-6,11-dichloro-morphanthridine | N-cyclopropylmethyl-N-propylamine | 9-trifluoromethyl-6,11-bis-(N-cyclopropyl-methyl-N-propylamino)-morphanthridine. |
| 8-nitro-2,6,11-trichloro-morphanthridine | Thiamorpholine | 2-chloro-8-nitro-6,11-bis-thiamorpholino-morphanthridine. |
| 2-dimethylamino-6-chloro-11-pyrrolidino-morphanthridine | 1-(2-hydroxyethyl)-piperazine | 2-dimethylamino-6[4(2-hydroxyethyl)-piperazino]-11-pyrrolidino-morphanthridine. |
| 3,8-dimethyl-6,11-dichloro-morphanthridine | 4-benzyl-piperazine | 3,8-dimethyl-6,11-bis-(4-benzyl-piperazino)-morphanthridine. |
| 9-methyl-6,11-dichloro-morphanthridine | Ethyleneimine | 9-methyl-6,11-bis-ethyl-eneimino-morphanthridine. |
| 6-chloro-11-pyrrolidino-morphanthridine | N-ethyl-N-benzylamine | 6-(N-ethyl-N-benzylamino)-11-pyrrolidino-morphanthridine. |

EXAMPLE 14

To 11.5 g. 6-chloro-11-pyrrolidino-morphanthridine the solution of 40 ml. morpholine in 150 ml. diethyl is added portionwise while stirring. The mixture is concentrated at the steam cone and then poured into ice water. The suspension is extracted with benzene, the extract washed with water and concentrated to about 20 ml. to the concentrate 200 ml. diethyl ether are added, the precipitate formed filtered off and recrystallized from methanol to yield the 6-morpholino-11-pyrrolidino-morphanthridine of the formula

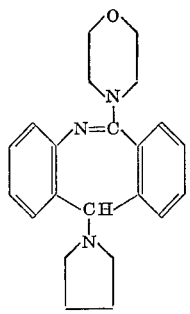

melting at 183–185°.

EXAMPLE 15

To 12 g. 6-chloro-11-morpholino-morphanthridine, 35 ml. pyrrolidine are added portionwise while cooling and stirring. The viscous mixture obtained is allowed to stand for 1½ hours at room temperature and is then poured into cold water. The precipitate formed is filtered off, washed with water, dried and dissolved in 1 liter diethyl ether. The solution is washed with water, dried, treated with charcoal and evaporated. The residue is recrystallized from methanol to yield the 6-pyrrolidino-11-morpholino-morphanthridine of the formula

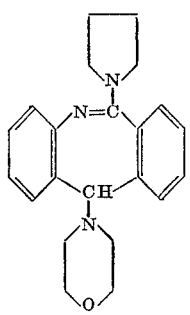

melting at 128.5–129.5°.

EXAMPLE 17

Preparation of 20,000 tablets each containing 0.1 g. of the active ingredient.

| Ingredients: | G. |
|---|---|
| 6,11-bis-pyrrolidino-morphanthridine | 2,000.0 |
| Gelatin | 150.0 |
| Corn starch (anhydrous) | 1,659.0 |
| Talcum | 625.0 |
| Stearic acid | 66.0 |
| Purified water, q.s. | |

Procedure

The active ingredient and 726 g. of the starch are passed through a screen with 1 mm. openings and mixed thoroughly. The gelatin is dissolved in 2 liters water, the solution combined with a suspension of 308 g. starch in 400 ml. cold water and the whole heated on a water bath until a paste is formed. It is combined with the sieved powders using additional water, if necessary. The granulate is passed through a screen with 4 mm. openings, dried at 49° and broken on a screen with 2 mm. openings of a comminuting machine, knives forward. The remaining 625 g. starch are added and the mixture compressed into tablets using standard concave punches doubly scored.

Analogous compositions are prepared by substituting the 6,11-bis-pyrrolidino-morphanthridine by the same amount of one of the morphanthridines described in Examples 1 and 3–16.

EXAMPLE 18

The mixture of 10.0 g. 6-chloro-11-dimethylamino-morphanthridine and 130 ml. diethylamine is allowed to stand for 2 days at room temperature in an open vessel. To the residue water and diethyl ether are added, the organic layer separated, washed with water, dried, filtered and evaporated. The residue is recrystallized from diethyl ether-petroleum ether, to yield the 6-diethyl-amino-11-dimethylamino-morphanthridine of the formula

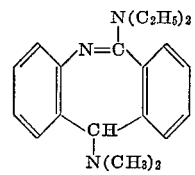

melting at 98–99°.

EXAMPLE 19

The mixture of 8.5 g. 2,6-dichloro-11-diethylamino-morphanthridine and 20 ml. morpholine is heated at the steam cone for 15 minutes and then evaporated to about half of the original volume. To the residue water is added, the precipitate formed filtered off, washed with water, dried and recrystallized from diethyl ether, to yield the 2-chloro-6-morpholino - 11 - diethylamino-morphanthridine of the formula

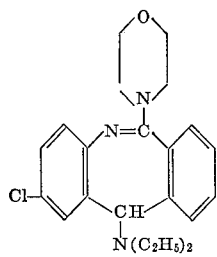

melting at 138–139°.

The starting material is prepared as follows: The mixture of 60.0 g. 2-chloro-11-hydroxy-5,6-dihydro-6-morphanthridone and 500 ml. thionyl chloride is heated at the steam cone until it becomes homogenous. It is then evaporated, the residue dissolved in ethyl acetate, the solution filtered and concentrated. Upon cooling, crystals separate, which are filtered off and recrystallized from ethyl acetate, to yield the 2,11-dichloro-5,6-dihydro-6-morphanthridone melting at 254–257° with decomposition.

The mixture of 20 g. thereof, 80 ml. diethylamine and 20 ml. ethanol is heated at the steam cone until dissolution occurs. It is then concentrated in vacuo to about 50 ml., the residue formed triturated with hot ethanol and recrystallized from ethanol, as well as diethyl ether, to yield the 2-chloro-11-diethylamino - 6-morphanthridone melting at 178–180°.

The mixture of 8.0 g. thereof and 150 ml. phosphorus oxychloride is refluxed for ½ an hour and allowed to stand at room temperature for 1 hour. It is evaporated in vacuo and the residue, containing the 2,6-dichloro-11-diethylamino-morphanthridine, used as such without further purification.

In the analogous manner, the 11-diethylamino-6-morphanthridone M.P. 159–160° and the 6-chloro-11-diethylamino-morphanthridine are prepared.

EXAMPLE 20

To 9.0 g. crude 6-chloro-11-diethylamino-morphanthridine 100 ml. ice-cold diethylamine are added dropwise while stirring. The mixture is allowed to stand at room temperature for 2 hours and then evaporated at the steam cone with the aid of an air stream. The residue is partitioned between water and diethyl ether, the organic layer separated, washed with water, dried, filtered and evaporated. The residue is recrystallized from aqueous ethanol to yield the 6,11-bis-diethylamino-morphanthridine of the formula

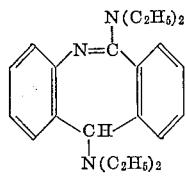

melting at 99–100°.

In the analogous manner, the 2-chloro-6,11-bis-diethylamino-morphanthridine is obtained, M.P. 102–103°.

EXAMPLE 21

The mixture of 1.0 g. 6-methoxy-11-(4-methyl-piperazino)-morphanthridine, 5 ml. 1-methyl-piperazine and 20 ml. ethanol is heated in a sealed tube to 125° for 5 hours. It is evaporated at the steam cone, the residue partitioned between water and diethyl ether, the organic layer washed with water, dried, filtered and evaporated. The residue is recrystallized from diethyl ether to yield the 6,11-bis - (4-methyl-piperazino)-morphanthridine melting at 96–98°; it is identical with the product obtained according to Example 5.

The starting material is prepared as follows: The mixture of 5.8 g. 11-(4-methyl-piperazino) - 5,6-dihydro-6-morphanthridone and 200 ml. phosphorus oxychloride is refluxed for 1 hour and evaporated in vacuo. To 6.5 g. of the residue the chilled solution, prepared from 5.5 g. soduim and 150 ml. methanol, is slowly added and the mixture allowed to stand for 3 hours at room temperature. It is concentrated in vacuo to 55 ml. and the concentrate diluted with water. The resulting mixture is extracted with diethyl ether, the extract washed with water, dried, filtered and evaporated. The residue is recrystallized from diethyl ether-petroleum ether and again from methanol, to yield the 6-methoxy - 11-(4-methyl-piperazino)-morphanthridine melting at 126–128°.

EXAMPLE 22

Preparation of 10,000 tablets each containing 50.0 mg. of the active ingredient:

| Formula: | G. |
|---|---|
| 6-morpholino-11-dimethylamino-morphanthridine | 500.00 |
| Lactose | 1,706.00 |
| Corn starch | 90.00 |
| Polyethylene glycol 6,000 | 90.00 |
| Talcum powder | 90.00 |
| Magnesium stearate | 24.00 |
| Purified water, q.s. | |

Procedure

All the powders are passed through a screen with an opening of 0.6 mm. Then the drug substance, lactose, talcum, magnesium stearate and half of the starch are mixed in a suitable mixer. The other half of the starch is suspended in 45 ml. water and the suspension added to the boiling solution of the polyethylene glycol in 180 ml. water. The paste formed is added to the powders which are granulated, if necessary, with an additional amount of water. The granulate is dried overnight at 35°, broken on a screen with 1.2 mm. openings and compressed into tablets using concave punches with 7.1 mm. diameter, uppers bisected.

In the analogous manner, shown in this example, as well as in Example 18, pharmaceutical compositions are prepared, comprising as the active ingredient about 25 to 50 mg. of one of the other compounds of the invention described in Examples 1, 3–12, 14–16, 19–21 and 23–28.

EXAMPLE 23

The mixture of 14 g. 6-chloro-11-diethylamino-morphanthridine and 100 ml. morpholine is heated at the steam cone for about 30 minutes and allowed to stand at room temperature overnight. Hereupon it is evaporated with the aid of an air stream, finally in vacuo, and the residue partitioned between water and diethyl ether. The organic layer is separated, washed with water, dried and concentrated to about 200 ml. The concentrate is cooled, the precipitate formed filtered off and recrystallized from diethyl ether to yield the 6-morpholino-11-diethylamino-morphanthridine of the formula

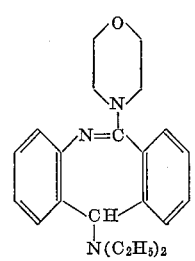

melting at 142–144°.

2.0 g. thereof are dissolved in the minimum amount of diethyl ether and the solution acidified with ethanolic hydrochloric acid. The precipitate formed is filtered off and recrystallized from methanol-ethylacetate-diethyl ether to yield the corresponding hydrochloride, melting at 226–227° with decomposition.

EXAMPLE 24

The mixture of 0.2 g. 2-chloro-6-morpholino-11-diethyl-amino morphanthridine, 20 ml. ethanol and 20 ml. methyl iodide is refluxed for 4 hours and allowed to stand at room temperature overnight. Hereupon it is evaporated in vacuo and the residue recrystallized from ethanol-diethyl ether to yield the 2-chloro-6-morpholino-11-diethylamino-morphanthridine methoiodide of the formula

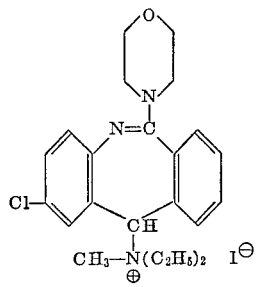

melting at 246–247° with decomposition.

EXAMPLE 25

To 11.0 g. 6-chloro-11-diethylamino-morphanthridine, 30 ml. benzylamine are added portionwise while cooling and the mixture is heated at the steam cone for 2 hours while stirring. Hereupon 150 ml. ethanol are added, and the mixture refluxed for another hour. After cooling, 800 ml. cold water are added, the mixture extracted with 1 liter diethyl ether, the extract washed with water, dried and evaporated. The residue is taken up in methanol, the solution filtered and diluted with water. The precipitate formed is dissolved and precipitated several times from aqueous methanol and diethyl ether, to yield the amorphous 6-benzylamino-11-diethylamino - morphanthridine of the formula

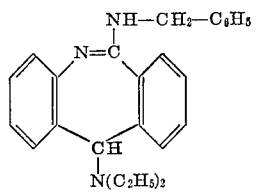

showing in the I.R.-spectrum inter alia bands at 1603, 1588, 1557 and 700 cm.$^{-1}$.

EXAMPLE 26

The mixture of 11 g. 6-chloro-11-diethylamino-morphanthridine, 60 ml. N-methyl-benzylamine and 250 ml. dioxane is heated at the steam cone for 3 hours while stirring. It is then concentrated to about half of its original volume, the concentrate cooled and diluted with water. The mixture is extracted with diethyl ether, the extract washed with water, dried, filtered and evaporated. The residue is recrystallized from methanol, to yield the 6-(N-methyl-N - benzylamino) - 11-diethylamino-morphanthridine of the formula

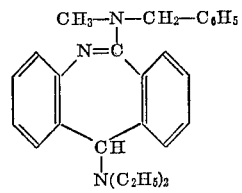

melting at 99–100°.

The same compound is obtained as follows: To the solution of 3.0 g. 6-benzylamino-11-diethylamino-morphanthridine in 25 ml. dimethylformamide, 0.75 g. of 56% sodium hydride in mineral oil are added, followed by 4 ml. methyl iodide, while stirring is continued for 1 hour at room temperature. The mixture is poured into 200 ml. water, the precipitate formed separated, dissolved in methanol, the solution filtered, evaporated and the residue recrystallized from methanol, to yield said 6-(N-methyl-N - benzyl-amino) - 11-diethylamino - morphanthridine, melting at 99–100°.

EXAMPLE 27

The mixture of 8.5 g. 2,6-dichloro-11-dimethylamino-morpholine and 85 ml. morpholine is heated at the steam cone for about 1 hour and allowed to stand at room temperature overnight. It is evaporated in vacuo, the residue partitioned between water and diethyl ether, the organic layer separated, concentrated and filtered. The filtrate is evaporated in vacuo, the residue taken up in diluted hydrochloric acid, the solution filtered and the filtrate made basic with aqueous sodium hydroxide. The precipitate formed is filtered off and recrystallized from diethyl ether, to yield the 2-chloro-6-morpholino-11-dimethylamino-morphanthridine of the formula

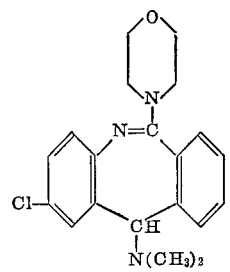

melting at 154–156°.

EXAMPLE 28

To 11 g. 6-chloro-11-diethylamino-morphanthridine, 500 ml. of a saturated solution of ammonia in dioxane are slowly added while stirring. The mixture is then heated to 70–80° while bubbling ammonia into it. Hereupon it is allowed to cool to room temperature and repeatedly heated to 80° during the ammonia addition. After about 3 hours the mixture is allowed to stand in a closed vessel at room temperature for 2 days. It is then concentrated to 120 ml., the precipitate formed filtered off and partitioned between water and diethyl ether. The organic layer is separated, washed with water, dried and evaporated. The residue is taken up in diluted hydrochloric acid, the solution filtered, the filtrate made basic with ice cold aqueous sodium hydroxide, the precipitate formed filtered off and dissolved and precipitated several times from diethyl ether, to yield the amorphous 6-amino-11-diethylamino-morphanthridine of the formula

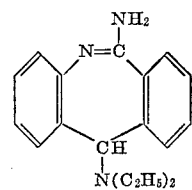

showing in the I.R.-spectrum inter alia bands at 6.24, 6.31 and 6.42μ.

EXAMPLE 29

The mixture of 13 g. 6-chloro-11-diethylamino-morphanthridine (Example 19), 80 ml. 1-methyl-piperazine and 100 ml. dioxane is heated at the steam cone for 45 minutes while stirring and is allowed to stand overnight at room temperature. It is evaporated in vacuo, the residue triturated with water and the mixture extracted with diethyl ether. The extract is washed with water, dried, filtered and evaporated. The residue is recrystallized from diethyl ether-petroleum ether, to yield the 6-(4-methylpiperazino)-11-diethylamino-morphanthridine of the formula

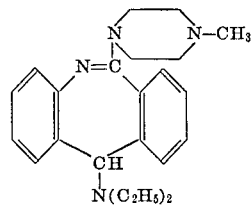

melting at 112–114°.

EXAMPLE 30

To 13.75 g. 6-chloro-11-dimethylamino-morphanthridine, 100 ml. piperidine are added while cooling in order to control the exothermic reaction. The mixture is stirred for 15 minutes and poured into an excess of water. The precipitate formed is filtered off, washed with water and taken up in diethyl ether. The extract is washed with water, dried over potassium carbonate, filtered and concentrated to about 40 ml. The crystals formed are collected, washed with diethyl ether, then petroleum ether-diethyl ether and recrystallized from diethyl ether, to yield the 11-dimethylamino-6-piperidino-morphanthridine of the formula

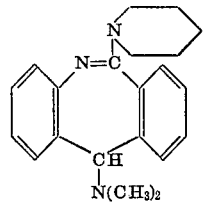

melting at 141–142°.

EXAMPLE 31

To 13.75 g. 6-chloro-11-dimethylamino-morphanthridine, 80 ml. N-methyl-2-hydroxyethylamine are added and the mixture heated on the steam cone until an exothermic reaction begins. The reaction is controlled by cooling in an ice bath and, after the reaction is complete, the mixture is allowed to stand at room temperature for about 2½ hours. It is evaporated in vacuo and the residue poured into ice water. The precipitate formed is filtered off, washed 3 times with water and taken up in about 750 ml. diethyl ether. The solution is dried over potassium carbonate, clarified with charcoal, filtered and evaporated. The residue is taken up in diethyl ether, the solution acidified with ethanolic hydrogen chloride and the crude hydrochloride formed collected. It is reconverted into the free base by treating it with 15% ice cold aqueous sodium hydroxide, the mixture extracted with diethyl ether, the extract washed 3 times with water, dried over potassium carbonate, filtered and evaporated. The residue is recrystallized from diethyl ether-petroleum ether, and finally from diethyl ether, to yield the 11-dimethylamino-6-(N-methyl-N-2-hydroxyethyl)-morphanthridine of the formula

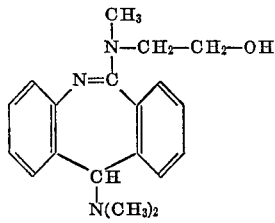

melting at 106–107°.

EXAMPLE 32

To 16.5 g. 6-chloro-11-dimethylamino-morphanthridine, 100 g. hexamethyleneimine are added and the mixture is heated until the reaction is complete. It is allowed to stand for 2 hours at room temperature and added to an excess of ice water. The mixture is extracted with diethyl ether, the extract washed 6 times with water, dried over potassium carbonate and filtered. The filtrate is evaporated, the residue taken up in 250 ml. diethyl ether-petroleum ether (1:1), the solution acidified with ethanolic hydrogen chloride and the precipitate formed filtered off. It is washed 3 times with diethyl ether, taken up in water, the solution treated with charcoal, filtered, the filtrate chilled and made alkaline with sodium hydroxide. The precipitate formed is taken up in diethyl ether, the solution filtered, the filtrate acidified with ethanolic hydrogen chloride and the precipitate formed recrystallized 3 times from methanol-diethyl ether (1:2), to yield the 11-dimethylamino - 6 - hexamethyleneimino-morphanthridine dihydrochloride 2½-hydrate of the formula

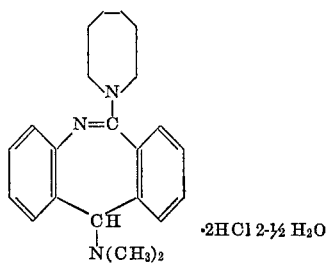

melting at 187–188° with decomposition.

What is claimed is:
1. A pharmaceutical composition comprising 1 to 50% of a compound having the formula

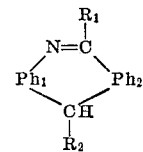

in which each of $Ph_1$ and $Ph_2$ is 1,2-phenylene, (lower alkyl)-1,2-phenylene, (lower alkoxy)-1,2-phenylene or (halogeno)-1,2-phenylene and each of $R_1$ and $R_2$ is di-lower alkylamino, $R_0$-phenyl-lower alkylamino, N-lower alkyl-N-($R_0$-phenyl)-lower alkylamino, lower alkyleneimino, monoaza-lower alkyleneimino, monooxa-lower alkyleneimino, monothia-lower alkyleneimino, N-lower alkyl-monoaza-lower alkyleneimino, N-(hydroxy-lower alkyl)-monoaza-lower alkyleneimino, N-(lower alkoxy-lower alkyl)-monoaza-lower alkyleneimino or N-(lower alkanoyloxy-lower alkyl)-monoaza-lower alkyleneimino, wherein the heteroatoms are separated by at least 2 carbon atoms, $R_0$ stands for hydrogen, lower alkyl, lower alkoxy or halogen, or a therapeutically acceptable acid addition salt or a lower alkyl quaternary halide thereof, together with a pharmaceutically excipient.

References Cited

UNITED STATES PATENTS 3,389,139   6/1968   Schmutz et al. _____ 260—268

ALBERT T. MEYERS, Primary Examiner

D. M. STEPHENS, Assistant Examiner